(12) United States Patent
Chen

(10) Patent No.: US 11,686,427 B1
(45) Date of Patent: Jun. 27, 2023

(54) SLIDABLE CONTAINER ASSEMBLY

(71) Applicant: Mingwei Chen, Covina, CA (US)

(72) Inventor: Mingwei Chen, Covina, CA (US)

(*) Notice: Subject to any disclaimer, the term of this patent is extended or adjusted under 35 U.S.C. 154(b) by 0 days.

(21) Appl. No.: 18/065,081

(22) Filed: Dec. 13, 2022

(51) Int. Cl.
*B65F 1/14* (2006.01)
*F16M 11/20* (2006.01)
*F16M 11/22* (2006.01)
*B65D 25/24* (2006.01)

(52) U.S. Cl.
CPC .......... *F16M 11/2092* (2013.01); *B65D 25/24* (2013.01); *B65F 1/141* (2013.01); *F16M 11/22* (2013.01)

(58) Field of Classification Search
USPC ..... 248/424, 429, 419, 420, 311.2; 220/562, 220/694, 737, 908; 312/334.8, 334.9, 312/334.11, 334.12, 334.13, 201; 211/162
See application file for complete search history.

(56) References Cited

U.S. PATENT DOCUMENTS

2008/0007147 A1* 1/2008 Skog ..................... B65F 1/1436
312/270.3
2009/0212678 A1* 8/2009 Sung .................... A47B 88/463
312/334.8

* cited by examiner

*Primary Examiner* — Alfred J Wujciak
(74) *Attorney, Agent, or Firm* — Novoclaims Patent Services LLC; Mei Lin Wong

(57) ABSTRACT

A slidable container assembly includes a sliding support mechanism and a storage container. The sliding support mechanism includes a first sliding track, a second sliding track and a container support arrangement. The container support arrangement includes a first front supporting platform, a second front supporting platform, a first rear supporting platform, a second rear supporting platform, a first front securing member and a second front securing member, a first rear securing member and a second rear securing member. The four base corner portions of the storage container are adapted to detachably dispose on the first front supporting platform, the second front supporting platform, the first rear supporting platform, and the second rear supporting platform. The storage container can be stably and securely slid out and then conveniently took out from the first sliding tracking and the second sliding track for cleaning or replacement.

8 Claims, 7 Drawing Sheets

SLIDABLE CONTAINER ASSEMBLY

BACKGROUND OF THE PRESENT INVENTION

Field of Invention

The present invention relates to a container support assembly, and more particularly to a slidable container assembly comprising a sliding support mechanism, which is capable of allowing the storage container to be easily retrieved from and securely disposed on the sliding support mechanism.

Description of Related Arts

A conventional storage container, such as a trash can, may be disposed on a specific storage compartment of a kitchen cabinet through some sorts of sliding support mechanisms. The storage container may be supported on a plurality of sliding tracks so that when the storage container is not in use, the storage container may be slid into the storage compartment. The storage compartment may then be closed for hygienic or aesthetic purpose. When the storage container is needed, a user may access the storage compartment and pull the storage container out of the storage compartment so that he may dispose or retrieve external objects to or from the storage container.

A major disadvantage of the conventional sliding support mechanism thus described is that it is very difficult to facilitate easy sliding and retrieval or replacement of the storage container. The storage container may be affixed on the sliding support mechanism so that it can be securely supported thereon. However, it will become very difficult for a user to retrieve or replace the storage container. On the other hand, when the storage container is loosely supported on the sliding support mechanism, a user may be able to easily retrieve or replace the storage container, yet the storage container may easily be toppled during sliding processes.

As a result, there is a need to develop a sliding support mechanism which is capable of allowing the storage container to be easily retrieved from and securely disposed on the sliding support mechanism.

SUMMARY OF THE PRESENT INVENTION

An object of the present invention is to provide a slidable container assembly comprising a sliding support mechanism which is capable of allowing the storage container to be easily retrieved from and securely disposed on the sliding support mechanism.

In one aspect of the present invention, it provides a sliding support mechanism for a storage container having four base corner portions, comprising:

a first sliding track having a first stationary track member and a first movable track member slidably coupled to said first stationary track member, said first movable track member having a first front portion and a first rear portion;

a second sliding track having a second stationary track member and a second movable track member slidably coupled to said second stationary track member, said second sliding track being positioned apart from said first sliding track, said second movable track member having a second front portion and a second rear portion; and a container support arrangement, which comprises:

a first front supporting platform defining a first front corner portion, said first front supporting platform connecting to said first front portion of said first movable track member;

a second front supporting platform defining a second front corner portion, said second front supporting platform connecting to said second front portion of said second movable track member;

a first rear supporting platform defining a first rear corner portion, said first rear supporting platform connecting to said first rear portion of said first movable track member;

a second rear supporting platform defining a second rear corner portion, said second rear supporting platform connecting to said second rear portion of said second movable track member;

a first front securing member and a second front securing member mounted on said first front corner portion and said second front corner portion respectively; and a first rear securing member and a second rear securing member mounted on said first rear corner portion and said second rear corner portion respectively, wherein the four base corner portions of the storage container are adapted to detachably dispose on the first front corner portion, the second front corner portion, the first rear corner portion and the second rear corner portion respectively, in such a manner that the four base corner portions of the storage container are tightly yet detachably biased by the first front corner portion, the second front corner portion, the first rear corner portion and the second rear corner portion respectively so as to securely and stably support the storage container on the first sliding track and the second sliding track even when the first movable track member and the second movable track member slide with respect to the first stationary track member and the second stationary track member respectively.

In another aspect of the present invention, it provides a slidable container assembly, comprising:

a storage container having four base corner portions;

a plurality of attachment members attached on the four base corner portions of the storage container respectively; and a sliding support mechanism, which comprises:

a first sliding track having a first stationary track member and a first movable track member slidably coupled to the first stationary track member, the first movable track member having a first front portion and a first rear portion;

a second sliding track having a second stationary track member and a second movable track member slidably coupled to the second stationary track member, the second sliding track being positioned apart from the first sliding track, the second movable track member having a second front portion and a second rear portion; and a container support arrangement, which comprises:

a first front supporting platform defining a first front corner portion, the first front supporting platform connecting to the first front portion of the first movable track member;

a second front supporting platform defining a second front corner portion, the second front supporting platform connecting to the second front portion of the second movable track member;

a first rear supporting platform defining a first rear corner portion, the first rear supporting platform connecting to the first rear portion of the first movable track member;

a second rear supporting platform defining a second rear corner portion, the second rear supporting platform connecting to the second rear portion of the second movable track member;

a first front securing member and a second front securing member mounted on the first front corner portion and the second front corner portion respectively; and a first rear securing member and a second rear securing member movably mounted on the first rear corner portion and the second rear corner portion respectively, wherein the four base corner portions of the storage container are adapted to detachably dispose on the first front corner portion, the second front corner portion, the first rear corner portion and the second rear corner portion respectively, in such a manner that the four base corner portions of the storage container are tightly yet detachably biased by the first front corner portion, the second front corner portion, the first rear corner portion and the second rear corner portion respectively so as to securely and stably support the storage container on the first sliding track and the second sliding track even when the first movable track member and the second movable track member slide with respect to the first stationary track member and the second stationary track member respectively, the four attachment members being positioned corresponding to the first front securing member, the second front securing member, the first rear securing member and the second rear securing member respectively when the storage container is detachably supported by the first front supporting platform, second front supporting platform, the first rear supporting platform and the second rear supporting platform.

This summary presented above is provided merely to introduce certain concepts and not to identify any key or essential features of the claimed subject matter.

DETAILED DESCRIPTION OF THE PREFERRED EMBODIMENT

Figure 1:
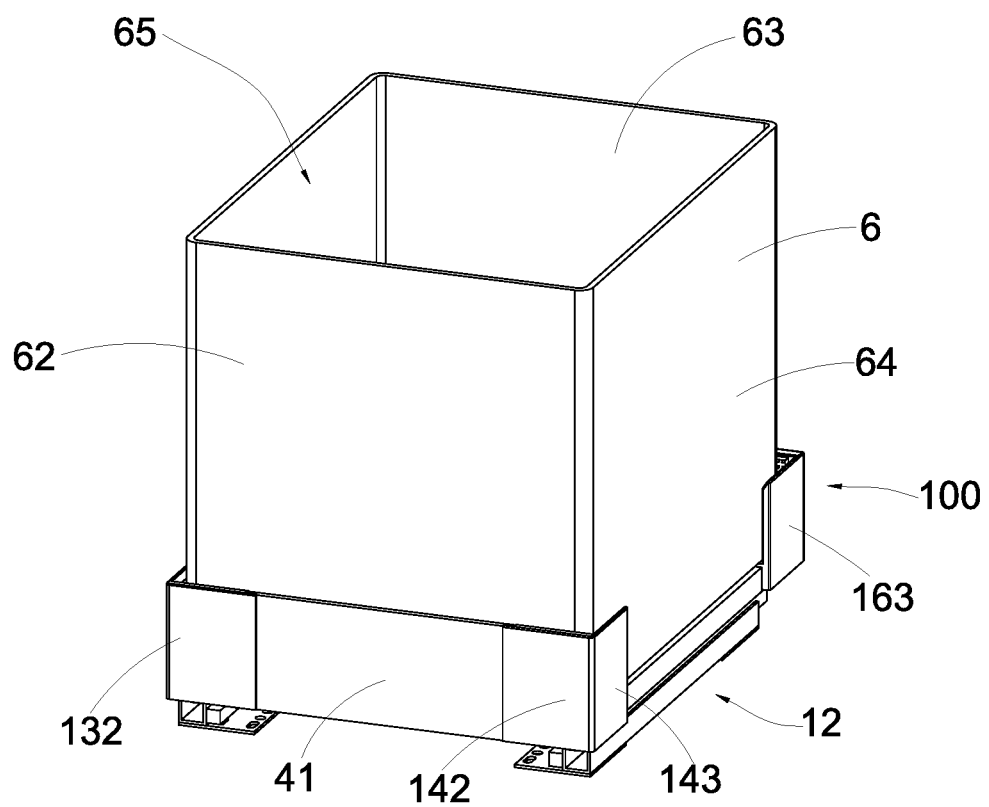
FIG. 1 is perspective view of a slidable container assembly according to a preferred embodiment of the present invention.
Figure 2:
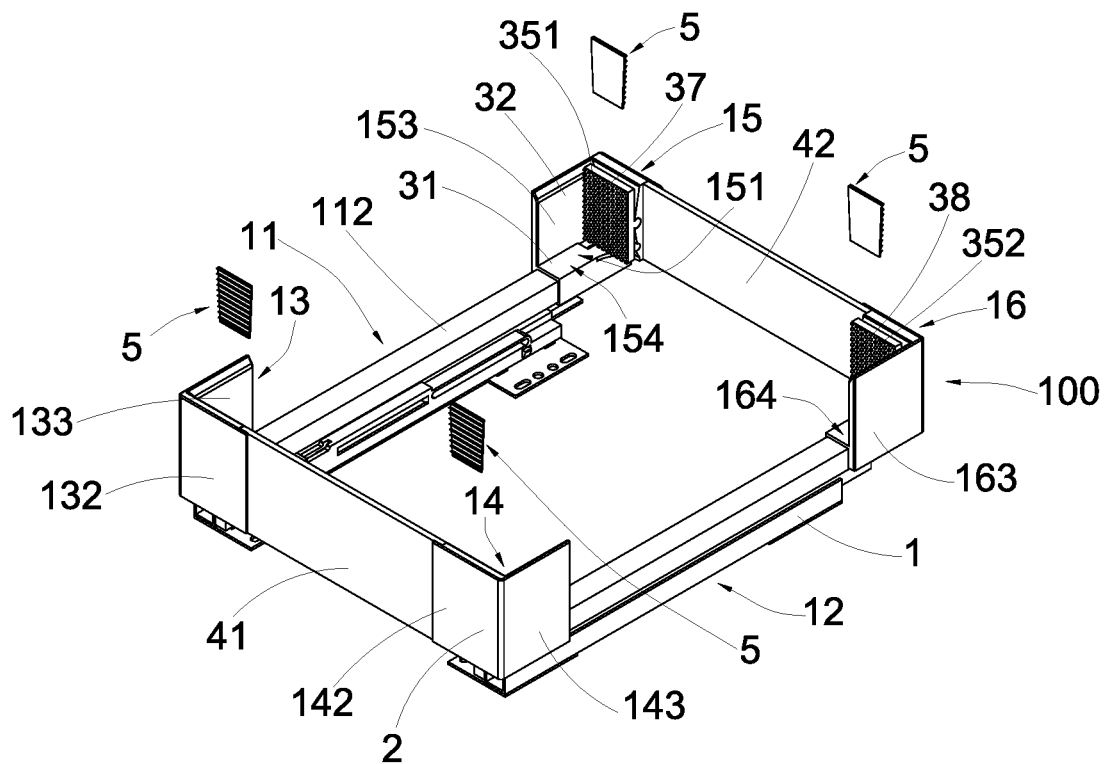
FIG. 2 is a perspective view of a sliding support mechanism according to the preferred embodiment of the present invention.
Figure 3:
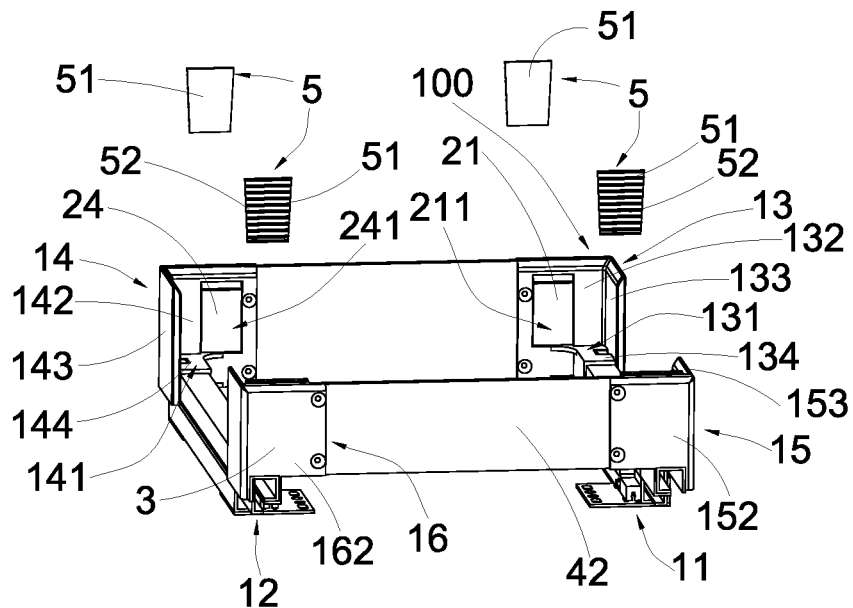
FIG. 3 is another perspective view of the sliding support mechanism according to the preferred embodiment of the present invention.

The following detailed description of the preferred embodiment is the preferred mode of carrying out the invention. The description is not to be taken in any limiting sense. It is presented for the purpose of illustrating the general principles of the present invention.

It should be appreciated that the terms "length", "width", "top", "bottom", "front", "rear", "left", "right", "vertical", "horizontal", "upper", "lower", "exterior", and "interior" in the following description refer to the orientation or positioning relationship in the accompanying drawings for easy understanding of the present invention without limiting the actual location or orientation of the present invention. Therefore, the above terms should not be an actual location limitation of the elements of the present invention.

It should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

It should be appreciated that the terms "install", "connect", "couple", and "mount" in the following description refer to the connecting relationship in the accompanying drawings for easy understanding of the present invention. For example, the connection can refer to permanent connection or detachable connection. Therefore, the above terms should not be an actual connection limitation of the elements of the present invention.

Referring to FIG. 1 to FIG. 12 of the drawings, a slidable container assembly according to a preferred embodiment of the present invention is illustrated. The slidable container assembly comprises a sliding support mechanism and a storage container 6 detachably supported by the sliding support mechanism.

Thus, the sliding support mechanism is for a storage container 6, such as a trash can, having four base corner portions 61. Broadly, the sliding support mechanism comprises a first sliding track 11, a second sliding track 12, and a container support arrangement 100. The container support arrangement 100 comprises a first front supporting platform 13, a second front supporting platform 14, a first rear supporting platform 15, a second rear supporting platform 16, a first front securing member 24, a second front securing member 21, a first rear securing member 351 and a second rear securing member 352.

The first sliding track 11 has a first stationary track member 111 and a first movable track member 112 slidably coupled to the first stationary track member 111. The first movable track member 112 has a first front portion 1121 and a first rear portion 1122.

The second sliding track 12 has a second stationary track member 121 and a second movable track member 122 slidably coupled to the second stationary track member 121. The second sliding track 12 is positioned apart from the first sliding track 11. The second movable track member 122 has a second front portion 1221 and a second rear portion 1222.

The first front supporting platform 13 defines a first front corner portion 131. The first front supporting platform 13 is connected to the first front portion 1121 of the first movable track member 112.

The second front supporting platform 14 defines a second front corner portion 141. The second front supporting platform 14 is connected to the second front portion 1221 of the second movable track member 122.

The first rear supporting platform 15 defines a first rear corner portion 151. The first rear supporting platform 15 connects to the first rear portion 1122 of the first movable track member 112.

The second rear supporting platform 16 defines a second rear corner portion 161. The second rear supporting platform 16 connects to the second rear portion 1222 of the second movable track member 122.

The first front securing member 24 and a second front securing member 21 are mounted on the first front corner portion 131 and the second front corner portion 141 respectively.

The first rear securing member 351 and a second rear securing member 352 are mounted on the first rear corner portion 151 and the second rear corner portion 161 respectively.

The four base corner portions 61 of the storage container 6 are adapted to detachably dispose on the first front corner portion 131, the second front corner portion 141, the first rear corner portion 151 and the second rear corner portion 161 respectively, in such a manner that the four base corner portions 61 of the storage container 6 are tightly yet detachably biased by the first front corner portion 131, the second front corner portion 141, the first rear corner portion 151 and the second rear corner portion 161 respectively so as to securely and stably support the storage container 6 on the first sliding track 11 and the second sliding track 12 even when the first movable track member 112 and the second movable track member 122 slide with respect to the first stationary track member 111 and the second stationary track member 121 respectively.

According to the preferred embodiment of the present invention, the storage container 6 may be configured as having a front wall 62, a rear wall 63 and two sidewalls 64 to define a storage cavity 65 as the space surrounded by the front wall 62, the rear wall 63 and the two sidewalls 64. Note that in this preferred embodiment, the storage container 6 may be shown to have a rectangular cross section when viewed from the top. However, the storage container 6 may be configured to have any cross-sectional shapes. The storage container 6 is for a user to store external objects, such as trash, in the storage cavity 65. The sliding support mechanism may be mounted on a base support of an external object, such as a base board of a kitchen cabinet, and the storage container 6 may be supported on the sliding support mechanism in a slidably moveable manner.

The first sliding track 11 and the second sliding track 12 are positioned to space apart from each other. Preferably, the first sliding track 11 and the second sliding track 12 are substantially parallel to each other. The first stationary track member 111 and the second stationary track member 121 are arranged to be mounted on an external object, preferably the base board of a cabinet so that the storage container 6 may be erected or stand in a storage compartment formed in the cabinet above the base board.

The first movable track member 112 is slidably coupled to the first stationary track member 111 in such a manner that the first movable track member 112 is arranged to slide along a longitudinal direction of the first stationary track member 111. Similarly, the second movable track member 122 is slidably coupled to the second stationary track member 121 in such a manner that the second movable track member 122 is arranged to slide along a longitudinal direction of the second stationary track member 121.

The first front supporting platform 13 comprises a first front base 134, a first front panel 132 and a first front side panel 133 connected to the first front panel 132 at approximately right angle (i.e. 90°), wherein the first front panel 132 and the first front side panel 133 upwardly extends from the first front base 134 to form the first front corner portion 131 of the first front supporting platform 13. The first front base 134 is arranged to overlappedly mount on the first front portion 1121 of the first movable track member 112.

The second front supporting platform 14 comprises a second front base 144, a second front panel 142 and a second front side panel 143 connected to the second front panel 142 at approximately right angle (i.e. 90°), wherein the second front panel 142 and the second front side panel 143 upwardly extends from the second front base 144 to form the second front corner portion 141 of the second front supporting platform 14.

The first front supporting platform 13 and the second front supporting platform 14 are mounted on the first front portion 1121 and the second front portion 1221 respectively in such a manner that the first front side panel 133 and the second front side panel 143 are facing each other. In other words, the first front supporting platform 13 and the second front supporting platform 14 are aligned with each other along a transverse direction of the first sliding track 11 and the second sliding track 12.

The first rear supporting platform 15 comprises a first rear base 154, a first rear panel 152 and a first rear side panel 153 connected to the first rear panel 152 at approximately right angle (i.e. 90°), wherein the first rear panel 152 and the first rear side panel 153 upwardly extends from the first rear base 154 to form the first rear corner portion 151 of the first rear supporting platform 15. The first rear base 154 is arranged to overlappedly mount on the first rear portion 1122 of the first movable track member 112.

The second rear supporting platform 16 comprises a second rear base 164, a second rear panel 162 and a second rear side panel 163 connected to the second rear panel 162 at approximately right angle (i.e. 90°), wherein the second rear panel 162 and the second rear side panel 163 upwardly extends from the second rear base 164 to form the second rear corner portion 161 of the second rear supporting platform 16.

The first rear supporting platform 15 and the second rear supporting platform 16 are mounted on the first rear portion 1122 and the second rear portion 1222 respectively in such a manner that the first rear side panel 153 and the second rear side panel 163 are facing each other. Thus, the first rear supporting platform 15 and the second rear supporting platform 16 are aligned with each other along a transverse direction of the first sliding track 11 and the second sliding track 12.

Figure 4:
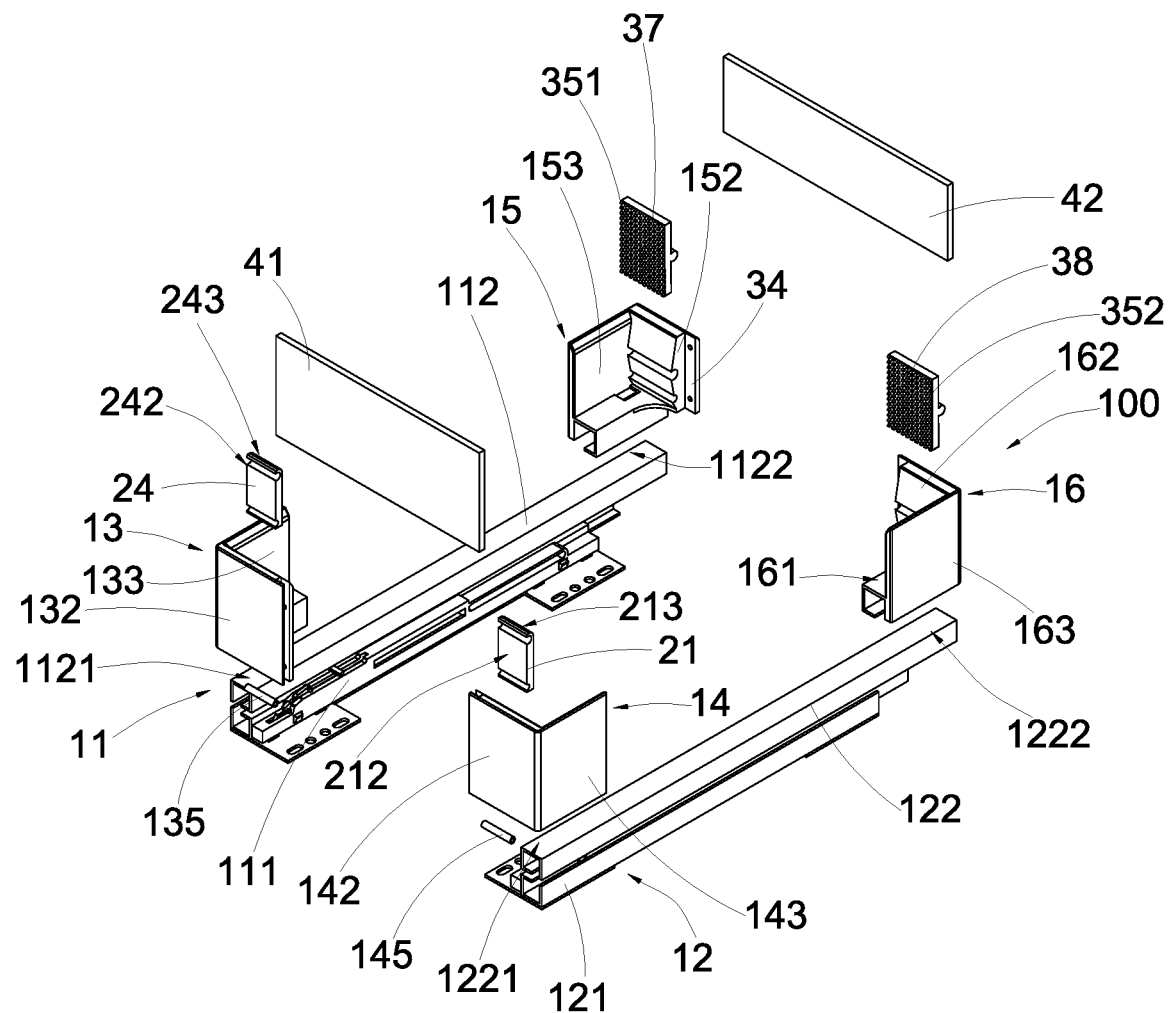
FIG. 4 is an exploded perspective view of the sliding support mechanism according to the preferred embodiment of the present invention.

As shown in FIG. 4 of the drawings, the first front supporting platform 13 and the first rear supporting platform 15 are mounted on the first sliding track 11 such that the first front panel 132 is arranged to face the first rear panel 152. Moreover, the second front supporting platform 14 and the second rear supporting platform 16 are mounted on the second sliding track 12 such that the second front panel 142 is arranged to face the second rear panel 162. Thus, the first front supporting platform 13 and the first rear supporting platform 15 are aligned with each other along a longitudinal direction of the first sliding track 11. The second front supporting platform 14 and the second rear supporting platform 16 are aligned with each other along a longitudinal direction of the second sliding track 12.

From the above description, it can be appreciated that the first front corner portion 131, the second front corner portion 141, the first rear corner portion 151 and the second rear corner portion 161 may form a secure boundary for accommodating the storage container 6.

The container support arrangement 100 further comprises a front connecting panel 41 mounted between the first front supporting platform 13 and the second front supporting platform 14, and a rear connecting panel 42 mounted between the first rear supporting platform 15 and the second rear supporting platform 16. The front connecting panel 41 and the rear connecting panel 42 serve to limit or ascertain the distance between the first sliding track 11 and the second sliding track 12. Thus, when a user wishes to assemble the sliding support mechanism of the present invention, he only needs to assemble the first front supporting platform 13 and first rear supporting platform 15 on the first sliding track 11 and utilize the front connecting panel 41 and the rear connecting panel 42 to ascertain the position of the second sliding track 12. As such, the user does not need to measure the distance between the first sliding track 11 and the second sliding track 12.

The first front securing member 24 and the second front securing member 21 are detachably connected to rear surfaces of the first front panel 132 and the second front panel 142 respectively. Similarly, the first rear securing member 351 and the second rear securing member 352 are detachably and movably connected to the front surfaces of the first rear panel 152 and the second rear panel 162 respectively. Therefore, the first front securing member 24 is positioned opposite to the first rear securing member 351 and they face each other. Similarly, the second front securing member 21 is positioned opposite to the second rear securing member 352 and they face each other.

According to the preferred embodiment of the present invention, each of the first front supporting platform 13, the second front supporting platform 14, the first rear supporting platform 15, the second rear supporting platform 16, the front connecting panel 41, and the rear connecting panel 42 may be configured from plastic or metallic material.

Each of the first front securing member 24 and the second front securing member 21 may be configured as a panel-like structure and may be detachably mounted on the rear surfaces of the first front panel 132 and the second front panel 142 respectively in such a manner that the first front securing member 24 and the second front securing member 21 may form a first inclined surface 241 and a second inclined surface 211 facing the first rear securing member 351 and the second rear securing member 352 respectively. Each of the first inclined surface 241 and the second inclined surface 211 may downwardly and inclinedly extend from top to bottom on rear surfaces of the first front panel 132 and the second front panel 142 respectively.

Figures 10, 11:
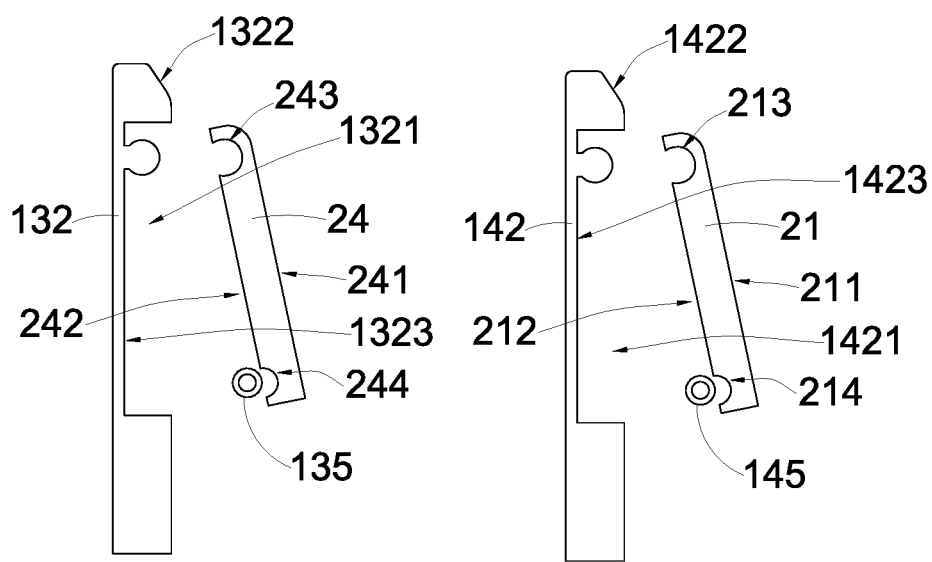
FIG. 10 is a schematic diagram of the sliding support mechanism according to the preferred embodiment of the present invention, illustrating the first front supporting platform.
FIG. 11 is a schematic diagram of the sliding support mechanism according to the preferred embodiment of the present invention, illustrating the second front supporting platform.
Figure 12:
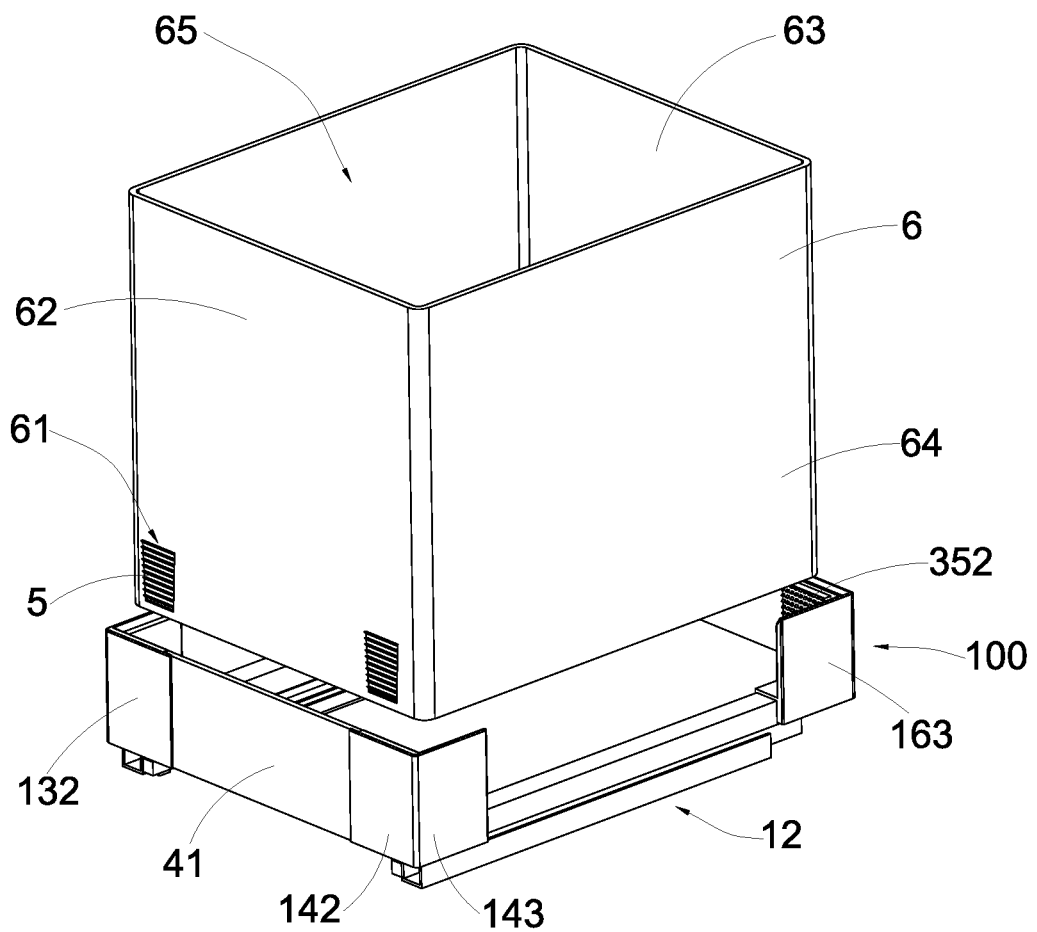
FIG. 12 is perspective view of a slidable container assembly according to a preferred embodiment of the present invention, illustrating that the storage container is detached from the sliding support mechanism.

As shown in FIG. 10 of the drawings, the first front panel 132 further has a first slot 1321 indently formed on a first rear surface 1322, while the first front securing member 24 is pivotally mounted on the first rear surface 1322 of the first front panel 132 in such a manner that the first front securing member 24 may pivotally and slightly move into the first slot 1321. Moreover, the container support arrangement 20 further comprises a first biasing member 135 affixed on a first front side 242 of the first front securing member 24 so that the first biasing member 135 is sandwiched between the first front securing member 24 and a first boundary surface 1323 of the first slot 1321. In this preferred embodiment of the present invention, a first top portion 243 of the first front securing member 24 is pivotally mounted on the first front panel 132 while the first biasing member 135 is arranged to be affixed on the first front side 242 at the first bottom portion 244 of the first front securing member 24. The result is that the first biasing member 135 is arranged to create a slight protrusion so as to slightly tilt the entire first front securing member 24 to form the first inclined surface 241.

Figure 5:
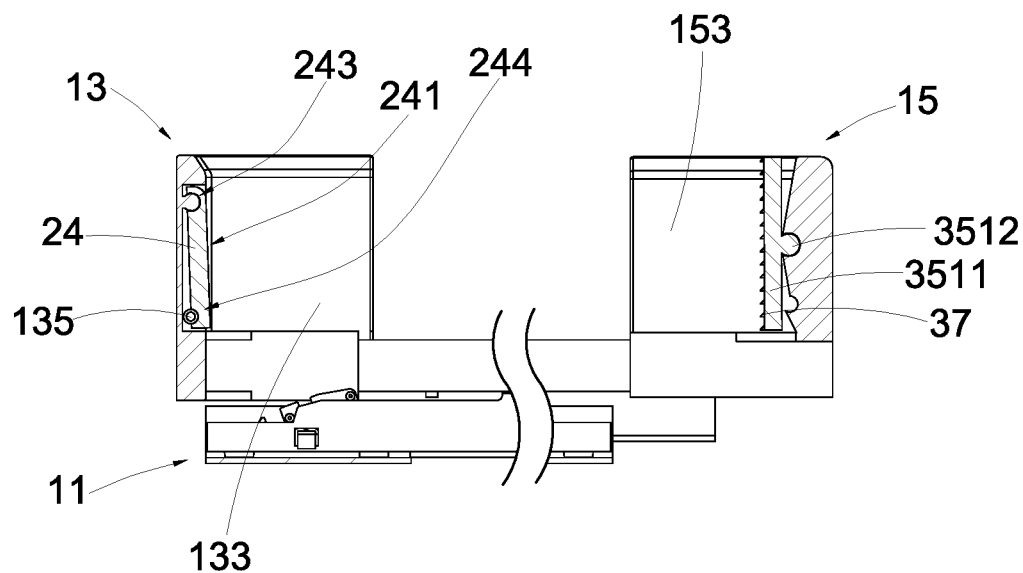
FIG. 5 is a sectional side view of the sliding support mechanism according to the preferred embodiment of the present invention, illustrating the first sliding track, the first front supporting platform and the first rear supporting platform.
Figure 6:
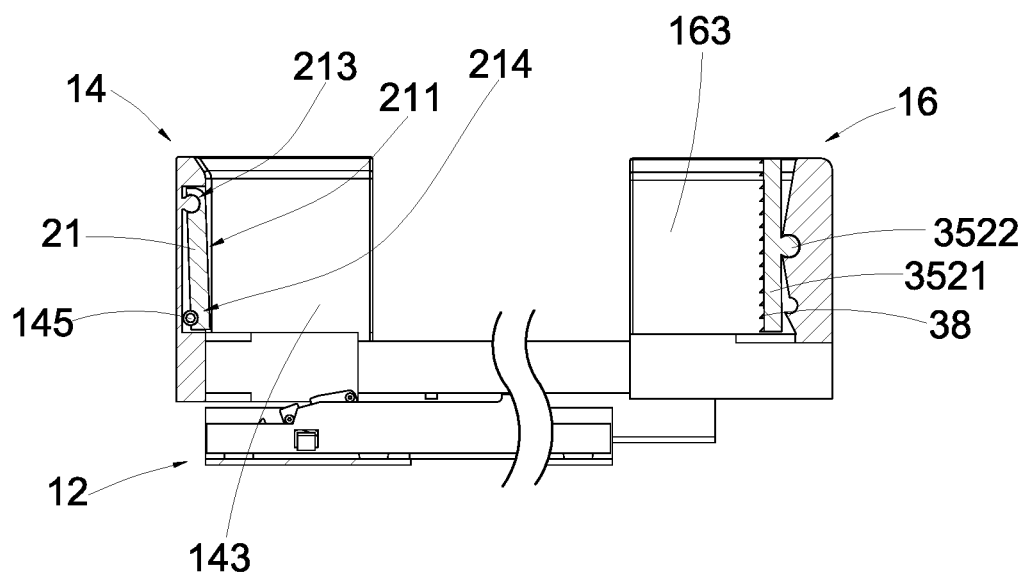
FIG. 6 is a sectional side view of the sliding support mechanism according to the preferred embodiment of the present invention, illustrating the second sliding track, the second front supporting platform and the second rear supporting platform.
Figure 7:
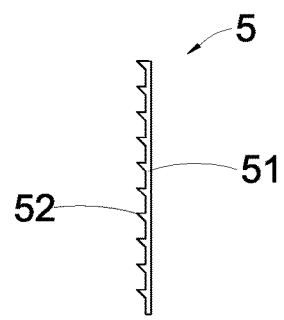
FIG. 7 is a schematic diagram of an attachment member of the sliding support mechanism according to the preferred embodiment of the present invention.

The first biasing member 135 may be configured from a material having a predetermined elasticity such as rubber material. Thus, the first front securing member 24 may be slightly move toward or away from the first front panel 132 in a pivotally manner, as shown in FIG. 5 of the drawings.

Similarly, as shown in FIG. 11 of the drawings, the second front panel 142 further has a second slot 1421 indently formed on a second rear surface 1422, while the second front securing member 21 is pivotally mounted on the second rear surface 1422 of the second front panel 142 in such a manner that the second front securing member 21 may pivotally and slightly move into the second slot 1421. Moreover, the container support arrangement 20 further comprises a second biasing member 145 affixed on a second front side 212 of the second front securing member 21 so that the second biasing member 145 is sandwiched between the second front securing member 21 and a second boundary surface 1423 of the second slot 1421. In this preferred embodiment of the present invention, a second top portion 213 of the second front securing member 21 is pivotally mounted on the second front panel 142 while the second biasing member 145 is arranged affixed on the second front side 212 at the second bottom portion 214 of the second front securing member 21. The second biasing member 145 is arranged to create a slight protrusion so as to slightly tilt the entire second front securing member 21 to form the second inclined surface 211.

The second biasing member 145 may be configured from a material having a predetermined elasticity such as rubber material. Thus, the second front securing member 21 may be slightly move toward or away from the second front panel 142.

Referring to FIG. 2 to FIG. 7 of the drawings, the first rear securing member 351 has a plurality of first engaging teeth 37 protruded therefrom. The second rear securing member 352 has a plurality of second engaging teeth 38 protruded therefrom. On the other hand, the sliding support mechanism further comprises a plurality of attachment members 5 adapted for attaching on the four base corner portions 61 of the storage container 6 respectively. Each of the attachment members 5 comprises an attachment body 51 and a plurality of attaching teeth 52 extended from the attachment body 51.

It is worth mentioning that the first rear securing member 351 and the second rear securing member 352 may be movably coupled to the first rear supporting platform 15 and the second rear supporting platform 16 respectively. In order to accomplish this arrangement, the first rear securing member 351 comprises a first blocking panel 3511 and a first coupling shaft 3512 rearwardly extended from the first blocking panel 3511, wherein the first engaging teeth 37 are provided on a front side of the first blocking panel 3511. On the other hand, the second rear securing member 352 comprises a second blocking panel 3521 and a second coupling shaft 3522 rearwardly extended from the second blocking panel 3521, wherein the second engaging teeth 38 are provided on a front side of the second blocking panel 3521.

Figure 8:
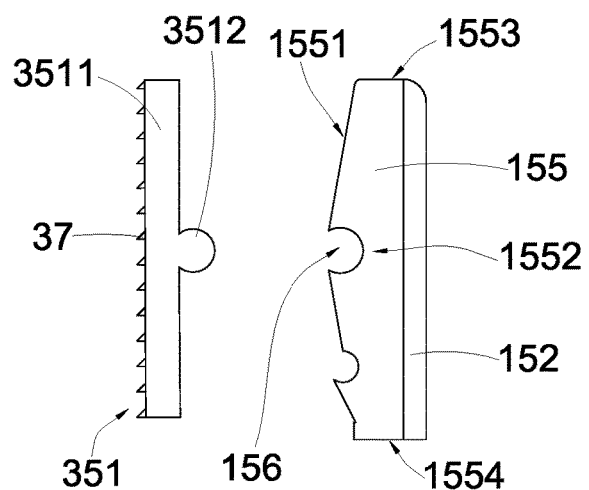
FIG. 8 is a schematic diagram of the sliding support mechanism according to the preferred embodiment of the present invention, illustrating the first rear supporting platform.

As shown in FIG. 8 of the drawings, the first rear supporting platform 15 further comprises a first coupling member 155 having a first coupling slot 156 mounted on the first rear panel 152. The first coupling member 155 has a first front surface 1551 inclinedly formed with respect to the first rear base 154 for forming a tapered or a substantially V-shaped cross section when viewed from the side. Thus, a thickness of the first coupling member 155 gradually decrease from a first mid portion 1552 toward an upper edge 1553 and a lower edge 1554 thereof. The first coupling slot 156 is formed on the mid-portion 1552 of the first coupling member 155. The first coupling shaft 3512 is arranged to movably engaged in the first coupling slot 156, so that the first rear securing member 351 can be movably mounted on the first coupling member 155, so as to allow the first rear securing member 351 to be movably coupled to the first rear supporting platform 15.

Figure 9:
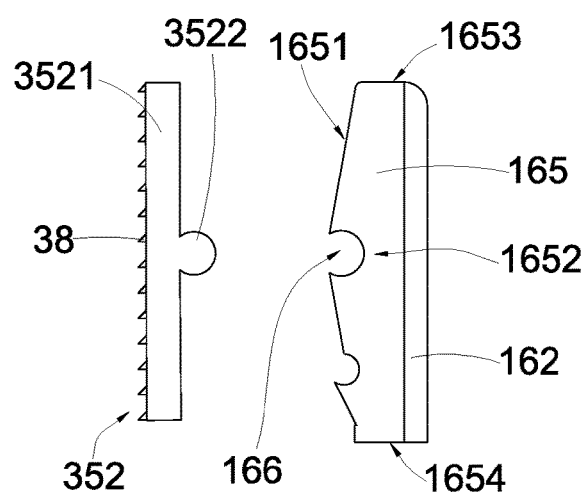
FIG. 9 is a schematic diagram of the sliding support mechanism according to the preferred embodiment of the present invention, illustrating the second rear supporting platform.

As shown in FIG. 9 of the drawings, the second rear supporting platform 16 further comprises a second coupling member 165 having a second coupling slot 166 mounted on the second rear panel 162. The second coupling member 165 has a second front surface 1651 inclinedly formed with respect to the second rear base 164 for forming a tapered or a substantially V-shaped cross section when viewed from the side. Thus, a thickness of the second coupling member 165 gradually decrease from a second mid portion 1652 toward an upper edge 1653 and a lower edge 1654 thereof. The second coupling slot 166 is formed on the mid-portion 1652 of the second coupling member 165. The second coupling shaft 3522 is arranged to movably engaged in the second coupling slot 166, so that the second rear securing member 352 can be movably mounted on the second coupling member 165, so as to allow the second rear securing member 352 to be movably coupled to the second rear supporting platform 16.

In this preferred embodiment of the present invention, the sliding support mechanism have four attachment members 5 attached on the four base corner portions 61 of the storage container 6 respectively. Furthermore, the four attachment members 5 are positioned corresponding to the first front securing member 24, the second front securing member 21, the first rear securing member 351 and the second rear securing member 352 respectively. When the storage container 6 is placed and supported by the first front supporting platform 13, the second front supporting platform 14, the first rear supporting platform 15 and the second rear supporting platform 16, the attaching teeth 52 of two of the corresponding attachment members 5 are arranged to detachably engage with the first engaging teeth 37 and the second engaging teeth 38 respectively so as to secure the position of the storage container 6 on the first rear supporting platform 15 and the second rear supporting platform 16.

Two of the attachment members 5 are mounted on the two corresponding base corner portions 61 of the storage container 6 so that their positions correspond to the first inclined surface 241 and the second inclined surface 211 respectively. As a result, when the storage container 6 is supported by the first front supporting platform 13 and the second front supporting platform 14, the two relevant and corresponding attachment members 5 are arranged to bias against the first inclined surface 241 and the second inclined surface 211 respectively.

The operation of the present invention may be described as follows: the sliding support mechanism may be assembled on a base board of a storage compartment of a cabinet as an example. A user needs to assemble the first sliding track 11 and the second sliding track 12. The distance between the first sliding track 11 and the second sliding track 12 may be dictated by the first connecting panel 41 and the second connecting panel 42. When properly mounted, the first sliding track 11, the second sliding track 12, the first front supporting platform 13, the second front supporting platform 14, the first rear supporting platform 15, the second rear supporting platform, the first connecting panel 41 and the second connecting panel 42 may form a quadrilateral structure when viewed from the top. This quadrilateral structure is arranged to detachably support the storage container 6.

On the other hand, the attachment members 5 are detachably attached on the four base corner portions 61 of the storage container 6 so that the four attachment members 5 are arranged to bias against the first inclined surface 241, the second inclined surface 211, the first rear securing member 351 and the second rear securing member 352 respectively.

According to the preferred embodiment of the present invention, a user is recommended to first slightly tilt the storage container 6 toward the rear side of the sliding support mechanism so as to allow good engagement between the first engaging teeth 37 and the second engaging teeth 38 with the corresponding attaching teeth 52. Since the first rear securing member 351 and the second rear securing member 352 are slightly movable as described above, the first engaging teeth 37 and the second engaging teeth 38 may be slightly moved and adjusted to fittingly engage with the attaching teeth 52 as the storage container 6 is pushed against the first rear supporting platform 15 and the second rear supporting platform 16. After these engagements, the user may then move the storage container 6 back toward the front side of the sliding support mechanism so as to allow the remaining two attachment members 5 to push and bias against the first inclined surface 241, the second inclined surface 211 respectively. Since the first front securing member 24 and the second front securing member 21 are biased against by the first biasing member 135 and the second biasing member 145 respectively, the pushing movement of the two corresponding attachment members 5 may facilitate secure and tight engagement between the storage container 6 and the first front supporting platform 13 and the second front supporting platform 14. The storage container 6 may then be disposed vertically above the first sliding track 11 and the second sliding track 12.

One skilled in the art may appreciate that the four base corner portions 61 of the storage container 6 are tightly and adequately secured and supported within the space surrounded by the first front supporting platform 13, the second front supporting platform 14, the first rear supporting platform 15 and the second rear supporting platform 16. As such, when the first movable track member 112 and the second movable track member 122 are slid out of the storage compartment of the cabinet (as an example), the storage container 6 will remain stable and stationary with respect to the sliding support mechanism.

When the user wishes to take out the storage container 6 from the sliding support mechanism, he or she simply needs to pull the storage container 6 upwardly from the container support arrangement 100. The user may then go on to empty or clean the storage container 6. After cleaning, the user needs only to put the storage container 6 back to the container support arrangement 100 in the manner described above.

Figure 13:
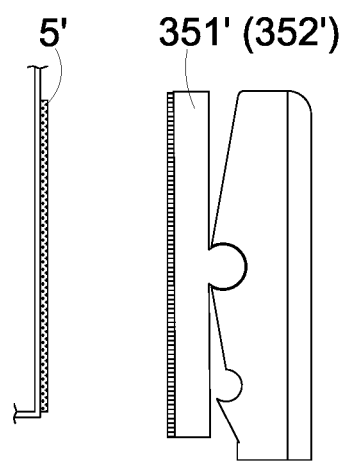
FIG. 13 is an alternative configuration of the first rear securing member and the second rear securing member according to the preferred embodiment of the present invention.

Referring to FIG. 13 of the drawings, an alternative mode of the sliding support mechanism according to the preferred embodiment of the present invention is illustrated. The alternative mode is identical to the preferred embodiment, except the first rear securing member 351', the second rear securing member 352' and the corresponding attaching members 5'. According to the alternative mode, the first rear securing member 351' and the second rear securing member 352' and the corresponding attaching members 5' may be embodied as hook and loop fasteners for easy attachment and detachment.

The present invention, while illustrated and described in terms of a preferred embodiment and several alternatives, is not limited to the particular description contained in this specification. Additional alternative or equivalent components could also be used to practice the present invention.

What is claimed is:

1. A slidable container assembly, comprising:
   a storage container having four base corner portions;
   a plurality of attachment members attached on said four base corner portions of said storage container respectively; and
   a sliding support mechanism, which comprises:
   a first sliding track having a first stationary track member and a first movable track member slidably coupled to said first stationary track member, said first movable track member having a first front portion and a first rear portion;
   a second sliding track having a second stationary track member and a second movable track member slidably coupled to said second stationary track member, said second sliding track being positioned apart from said first sliding track, said second movable track member having a second front portion and a second rear portion; and
   a container support arrangement, which comprises:
   a first front supporting platform defining a first front corner portion, said first front supporting platform connecting to said first front portion of said first movable track member;
   a second front supporting platform defining a second front corner portion, said second front supporting platform connecting to said second front portion of said second movable track member;
   a first rear supporting platform defining a first rear corner portion, said first rear supporting platform connecting to said first rear portion of said first movable track member;
   a second rear supporting platform defining a second rear corner portion, said second rear supporting platform connecting to said second rear portion of said second movable track member;
   a first front securing member and a second front securing member mounted on said first front corner portion and said second front corner portion respectively; and
   a first rear securing member and a second rear securing member movably mounted on said first rear corner portion and said second rear corner portion respectively,
   wherein said four base corner portions of said storage container are adapted to detachably dispose on said first front corner portion, said second front corner portion, said first rear corner portion and said second rear corner portion respectively, in such a manner that said four base corner portions of said storage container are tightly yet detachably biased by said first front corner portion, said second front corner portion, said first rear corner portion and said second rear corner portion respectively so as to securely and stably support said storage container on said first sliding track and said second sliding track even when said first movable track member and said second movable track member slide with respect to said first stationary track member and said second stationary track member respectively, said four attachment members being positioned corresponding to said first front securing member, said second front securing member, said first rear securing member and said second rear securing member respectively when said storage container is detachably supported by said first front supporting platform, second front supporting platform, said first rear supporting platform and said second rear supporting platform.

2. The slidable container assembly, as recited in claim 1, wherein said first front supporting platform comprises a first front base, a first front panel and a first front side panel connected to said first front panel at approximately right angle, wherein said first front panel and said first front side panel upwardly extend from said first front base to form said first front corner portion of said first front supporting platform, said second front supporting platform comprising a second front base, a second front panel and a second front side panel connected to said second front panel at approximately right angle, wherein said second front panel and said second front side panel upwardly extend from said second front base to form said second front corner portion of said second front supporting platform.

3. The slidable container assembly, as recited in claim 2, wherein said first rear supporting platform comprises a first rear base, a first rear panel and a first rear side panel connected to said first rear panel at approximately right angle, wherein said first rear panel and said first rear side panel upwardly extend from said first rear base to form said first rear corner portion of said first rear supporting platform, said second rear supporting platform comprising a second rear base, a second rear panel and a second rear side panel connected to said second rear panel at approximately right angle, wherein said second rear panel and said second rear side panel upwardly extend from said second rear base to form said second rear corner portion of said second rear supporting platform.

4. The slidable container assembly, as recited in claim 3, wherein said first front supporting platform, said second front supporting platform, said first rear supporting platform and said second rear supporting platform are mounted on said first sliding track and said second sliding track in such a manner that said first front supporting platform and said second front supporting platform are aligned with each other along a transverse direction of said first sliding track and said second sliding track, said first rear supporting platform and said second rear supporting platform being aligned with each other along a transverse direction of said first sliding track and said second sliding track, said first front supporting platform and said first rear supporting platform being aligned with each other along a longitudinal direction of said first sliding track, said second front supporting platform and said second rear supporting platform being aligned with each other along a longitudinal direction of said second sliding track.

5. The slidable container assembly, as recited in claim 4, wherein said first front securing member and said second front securing member are detachably mounted on said first front panel and said second front panel respectively in such a manner that said first front securing member and said second front securing member form a first inclined surface and a second inclined surface facing said first rear securing member and said second rear securing member respectively.

6. The slidable container assembly, as recited in claim 5, wherein said first front panel further has a first slot indently formed on a first rear surface of said first front panel, while said first front securing member is pivotally mounted on said first rear surface of said first front panel in such a manner that said first front securing member is pivotally and slightly move toward said first slot, said container support arrangement further comprises a first biasing member affixed on a first front side of said first front securing member so that said first biasing member is sandwiched between said first front securing member and said first slot, so that said first biasing member is arranged to create a slight protrusion so as to slightly tilt said entire first front securing member to form said first inclined surface.

7. The slidable container assembly, as recited in claim 6, wherein said first rear securing member has a plurality of first engaging teeth protruded therefrom, said second rear securing member having a plurality of second engaging teeth protruded therefrom, each of said attachment members comprising an attachment body and a plurality of attaching teeth extended from said attachment body for detachably engaging with said first engaging teeth and said second engaging teeth respectively.

8. The slidable container assembly, as recited in claim 7, wherein said first rear securing member comprises a first blocking panel and a first coupling shaft rearwardly extended from said first blocking panel, wherein said first engaging teeth are provided on a front side of said first blocking panel, said first rear supporting platform further comprising a first coupling member having a first coupling slot mounted on said first rear panel, said first coupling member having a first front surface which is inclined for forming a tapered cross section, a thickness of said first coupling member gradually decreases from a first mid portion toward an upper edge and a lower edge of said first coupling member, said first coupling slot being formed on said mid-portion of said first coupling member, said first coupling shaft is arranged to movably engaged in said first coupling slot, so as to allow said first rear securing member to be movably coupled to said first rear supporting platform.

\* \* \* \* \*